United States Patent [19]

Marans

[11] Patent Number: 4,778,390
[45] Date of Patent: Oct. 18, 1988

[54] METHOD AND APPARATUS FOR TEACHING FRACTIONS

[76] Inventor: Barbara Marans, 102 Krystal Dr., Somers, N.Y. 10589

[21] Appl. No.: 914,166

[22] Filed: Oct. 1, 1986

[51] Int. Cl.$^4$ ............................................. G09B 19/02
[52] U.S. Cl. ................................. 434/187; 434/196
[58] Field of Search ................. 434/187, 196, 197; 33/1 SD, 483, 484

[56] References Cited

U.S. PATENT DOCUMENTS

| | | | |
|---|---|---|---|
| 1,649,578 | 11/1927 | Deming | 434/196 |
| 3,204,344 | 9/1965 | McMeen | 434/196 |
| 4,144,657 | 3/1979 | Dumovich | 434/187 |

FOREIGN PATENT DOCUMENTS

| | | | |
|---|---|---|---|
| 9171 | 2/1905 | United Kingdom | 434/196 |
| 28119 | of 1912 | United Kingdom | 434/196 |

Primary Examiner—Carl D. Friedman
Assistant Examiner—Caroline D. Dennison
Attorney, Agent, or Firm—Mark P. Stone; F. Eugene Davis, IV

[57] ABSTRACT

The present invention is directed to a method and apparatus for teaching fractions to school age children. The invention provides an instrument having a base with at least two aligned scales of corresponding numerical indicia subdivided into different fractional units, as for example halves, thirds, quarters, sixths, and eighths. The base defines a space or gap between the different fractional scales so that a writing media, such as a piece of paper, may be inserted between the scales and moved either horizontally or vertically relative to one or more of the scales. The instrument provides an easy manner for a student to compare fractional units of the same integer and also to add and subtract both fractions and mixed numbers. In the preferred embodiment of the invention, the base of the instrument may be transparent so that all fractional scales are visible to the student simultaneously.

20 Claims, 2 Drawing Sheets

METHOD AND APPARATUS FOR TEACHING FRACTIONS

BACKGROUND OF THE INVENTION

The present invention is directed to a method and apparatus for aiding students in the understanding of the concept of fractions and operations therewith.

It is well known in the educational field that it is a difficult task teaching elementary school aged children about the concept of fractions. However, it is important to properly develop a proper basic understanding by the students since this is concept which must last them a lifetime. In most educational systems, students are first exposed to fractions at the age of about seven or eight years, where it is important that new concepts be clearly illustrated and physically displayed for a proper understanding by the students. It is therefore quite important that the concept of fractions be clearly physically perceivable to students from their first exposure to that concept in order to foster a proper understanding and development.

It is an object of the present invention to provide a learning tool or instrument for school aged children with which they may readily physically compare different fractional portions of the same unit. It is a further object of the invention to provide a method and apparatus in which students learning about fractions may themselves readily perform simple operations such as addition anad subtraction of both fractions and mixed numbers.

Other objects and advantages of the invention will become apparent from the description which follows:

SUMMARY OF THE INVENTION

The present invention is directed to a teaching method and apparatus to aid students in their understanding of the concept of mathematical fractions. A tool includes a base having a plurality of scales oriented adjacent to each other. Each scale includes numerical indicia corresponding to at least one or more of the same whole numbers or integers in alignment with each other. Each of the different scales includes appropriate numerical indicia subdividing the respective scale into different fractional units, as for example, eighths, sixths, quarters, thirds, or halves. The base defines a space between the respective scales so that a suitable writing media, as for example a piece of paper, may be selectively inserted through the space and adjacent to one or more of the scales. The paper may be slid longitudinally through the space relative to any single selected scale, and the paper may also be slid transversely relative to the different scales on the base. In this manner, a student may make an appropriate reference mark on the paper corresponding to a particular fraction and thereafter move the paper along the same or different scales to compare the marked fraction to another. By making additional appropriate reference marks on the paper, the student may also perform simple operations of addition and subtraction of different fractions and mixed numbers. In the preferred embodiment of the invetion, the base is formed from a flexible transparent plastic material, and may have suitable openings at one end so that it may be removably mounted in a loose leaf type schoolbook of the student.

DESCRIPTION OF THE BEST MODE FOR CARRYING OUT THE INVENTION

Figure 1:
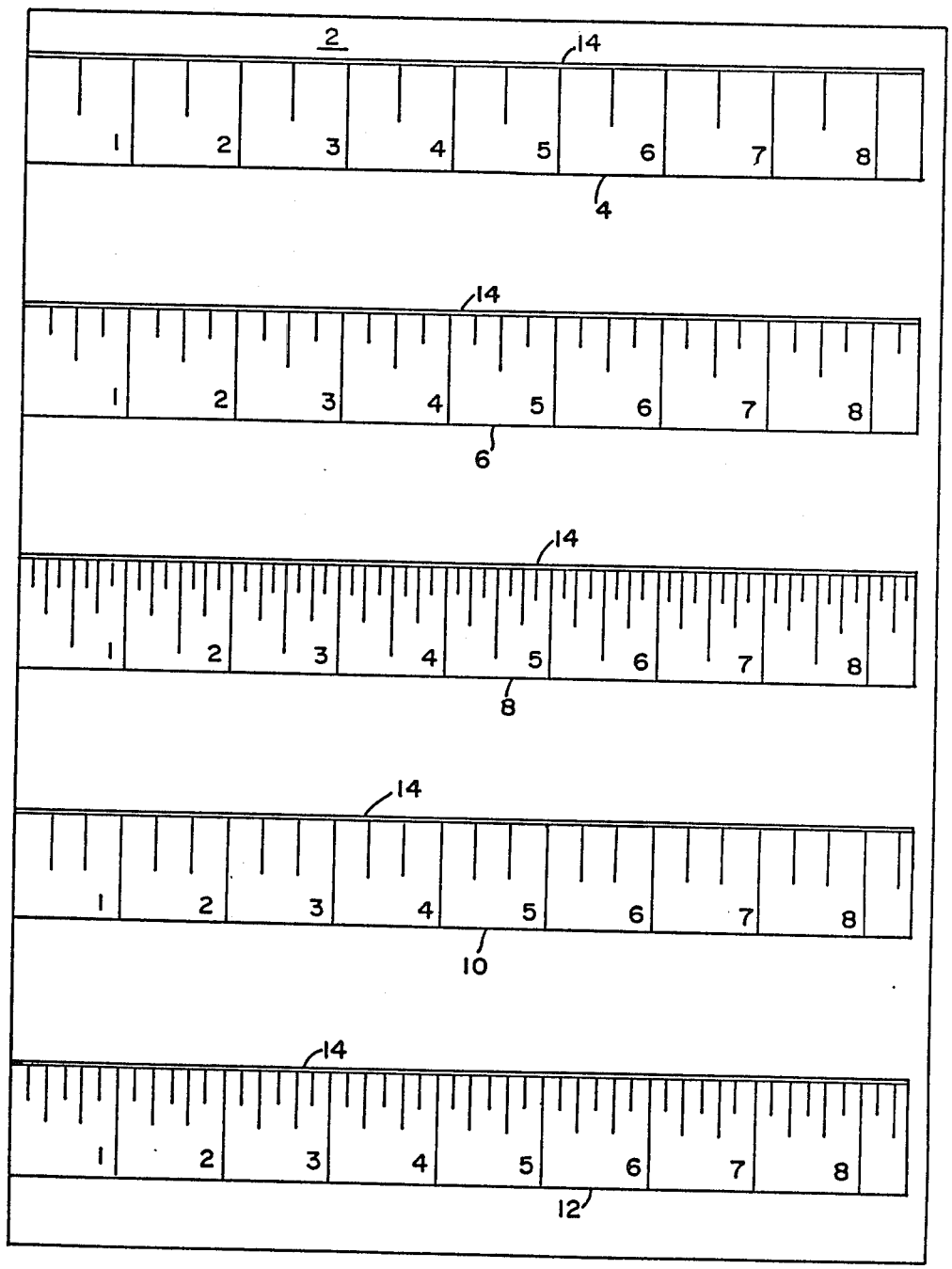
FIG. 1 illustrates a teaching tool in accordance with the present invention in which a base is provided with five different aligned, adjacent scales of the same whole numbers subdivided respectively into different fractional numerical indicia of halves, quarters, eighths, thirds, and sixths, and FIG. 2 of the drawings illustrate a teaching tool in accordace with the present invention in which in writing medium is shown contiguous with a scale on the base and extending completely through the base.
Figure 2:
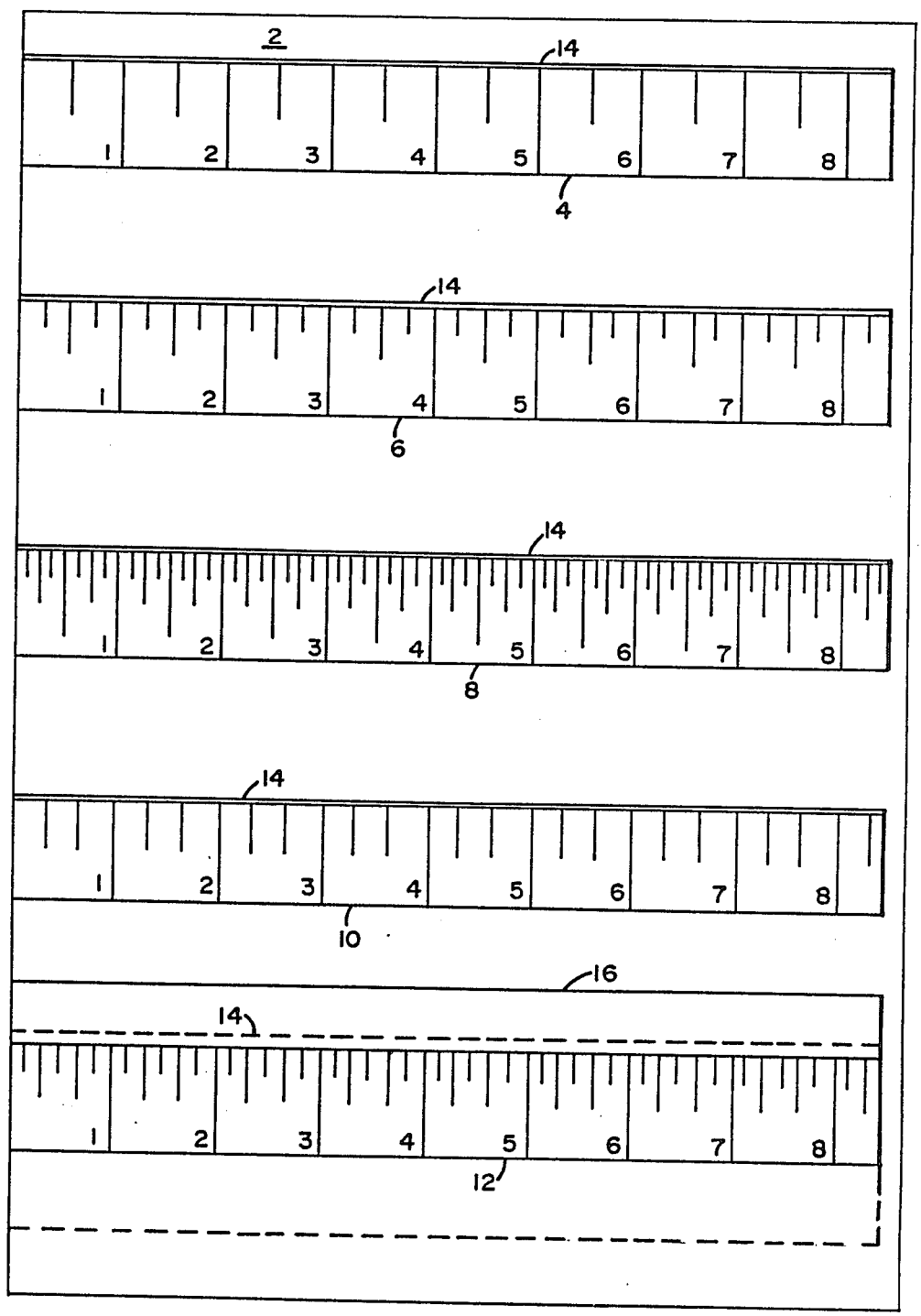

FIGS. 1 and 2 of the drawing represent an illustrative embodiment of the teaching tool of the present invention. The tool is designated generally by the reference numeral 2 and may be formed from a wide variety of materials, as for example, transparent plastic or even cardboard The tool includes five horizontally oriented scales designated by the reference numerals 4, 6, 8, 10, and 12, respectively. For illustrative purposes, each of these scales includes eight different whole numbers or units marked with appropriate numerical indicia. The scales are oriented in vertical alignment with each other so that the respective whole units on each scale are in registration. Each of the scales includes additional indicia or markings subdividing the whole units on each of the respective scales into different fractional portions. More specifically, scale 4 represents halves, scale 6 represents quarters, scale 8 represents eighths, scale 10 represents thirds, and scale 12 represents sixths. As illustrated in the drawing figure, the fractional scales are oriented horizontally across the base and are in vertical alignment. It is of course well within the scope of the invention to reverse this orientation so that the scales run vertically and are in horizontal alignment and registration.

The base 2 defines a plurality of longitudinally (horizontally) extending spaces or slits 14 proximate to the upper surface of each fractional scale. The slits extend substantially through throughout the length of the scales and are parallel with the scales. The fractional numerical indicia of each scale terminate at the upper edge of the respective scale directly adjacent to its respective slit 14. The respective spaces 14 are open at the left end of the drawing corresponding to the first whole unit, but are closed at the right end of the drawing so that each of the respective scales remain integrally attached to the base 2. Openings (not shown) may be provided at the right of the base for removably mounting the base into a student's looseleaf type binder.

FIG. 2 of the drawings illustrates the relationship between the teaching tool of the present invention and a writing medium 16, which may be a sheet of paper. Elements corresponding to those shown in FIG. 1 have been designated by the same reference numbers in FIG. 2. As illustrated in FIG. 2, the writing medium 16 is contiguous with one of the scales 4, 6, 8, 10, or 12 (in this case, the lower scale 12) defined by the base 2. As also illustrated, a portion of the writing medium 16 extends completely through the slit 14 (shown in phantom) which is adjacent to the scale 12.

In operation, a writing medium, as for example a sheet of paper, may be inserted underneath any of the scales 4, 6, 8, 10, or 12. A portion of the paper is inserted through the space or slit 14 adjacent to the upper edge of the respective scale. A suitable reference mark is made on the inserted sheet of paper to indicate the forward end of the scale. In the alternative, the left hand edge of the paper itself may be aligned with the left hand edge of the base 2 so that the respective edges correspond to each other and the need to mark the paper to reference the forward end of any scale is eliminated. Thereafter, a student may mark the inserted sheet of paper with an additional reference mark corresponding to a particular fraction on the scale which is being used. The paper then may be removed from the base and inserted through the slit corresponding to a different fractional scale. By properly aligning the paper with the leading edge of another fractional scale and making suitable reference marks corresponding to the fraction of the scale, the student may readily physically compare different fractional values, as for example by drawing a line from the left hand edge of the inserted paper to the different reference marks.

It is likewise apparent that the educational tool of the present invention may be used to perform simple manipulations with fractions, as for example addition and subtraction. When adding fractions, the student proceeds as discussed above to physically represent a particular fraction on a sheet of paper, making all appropriate reference markings. Once this is done, the paper is removed from the base and inserted into the space corresponding to the scale of a different fraction to be added. The reference mark corresponding to the first fraction is aligned with the forward edge of the second scale and an additional reference mark is made for representing the second fraction. It is apparent that the second reference mark corresponds to the sum of the two fractions. The student may then draw a line representing this sum and then seek to match the line with the appropriate fractional scale to obtain a numerical value representing the sum. It is clear that operation of simple subtraction of fractions may be accomplished by the above-described procedure operating in reverse.

Because each scale on the base is adjacent to a parallel slit, the paper or writing medium used by the student may be readily slid horizontally along each scale during the above-described procedures. Additionally, the paper may likewise be readily slid vertically from one scale to another so that the paper need not be removed from the initial slit in all instances.

It is evident that the above-described tool provides a simple method and apparatus for teaching students basic fractional skills by enabling the students to physically compare different fractions and perform simple mathematical operations. Many variations and modifications within the scope of the invention described herein will become apparent to those skilled in the art. As noted above, the orientation of the fractional scales may be varied from that shown in the drawing. Additionally, the instrument itself may be made from a wide variety of materials, as for example transparent plastic or cardboard, and the various numerical indicia may be applied in many different ways known to the art, as for example by direct printing on the respective scales or by labels. Accordingly, the embodiment of the invention described above is intended to be illustrative only, and not restrictive of the scope of the invention, that scope being defined by the following claims and all equivalents thereto.

I claim:

1. An apparatus for teaching fractional skills, said apparatus including:
   a base having a front and a rear surface,
   said base having a first scale with indicia representing a predetermined number of whole units,
   said base including a second scale with a predetermined number of indicia representing whole units corresponding to said first scale,
   said first and second scales being defined on said base in alignment with each other,
   said first scale further including indicia subdividing said first scale into predetermined fractional units,
   said second scale further including indicia subdividing said second scale into predetermined fractional units differing from said predetermined fractional units of said first scale,
   said base having a plurality of slits corresponding in number to at least the number of said scales, each of said slits extending completely through said base between said front and rear surfaces, at least one slit being defined adjacent to each of said scales for slideably inserting a writing medium through said at least one slit so that at least a portion of said writing medium is contiguous with said scale corresponding to said at least one slit and another portion of said writing medium completely extends through said base.

2. The apparatus of claim 1 wherein said base is formed from a plastic material.

3. The apparatus of claim 1 wherein said base is formed form a transparent material.

4. The apparatus of claim 1 wherein said indicia are printed directly on said scales.

5. The apparatus of claim 1 wherein each of said plurality of slits is parallel to a different one of said scales.

6. The apparatus of claim 1 wherein the length of each of said plurality of slits is substantially equivalent to the length of each of said scales.

7. The apparatus of claim 1 wherein said first and second scales are oriented horizontally along said base.

8. The apparatus of claim 1 wherein said base defines a plurality of scales.

9. The apparatus of claim 8 wherein said base defines at least five scales.

10. The apparatus of claim 9 wherein said respective scales are subdivided into fractional units representing halves, quarters, thirds, sixths, and eighths.

11. A method for teaching fractional skills, said method including the steps of:
    providing a base defining a plurality of scales, each of said scales having a predetermined number of indicia representing whole units which are subdivided into different predetermined fractional units, said base having front and rear surfaces,
    cutting a plurality of slits out of said base, each of said slits being adjacent to a different one of said scales, each of said slits extending competely through said base between said front and rear surfaces,
    inserting a writing medium through one of said slits so that a portion of said writing medium is adjacent to said scale corresponding to said one slit and another portion of said writing medium extends completely through said base, and
    marking a first reference indication on said writing medium corresponding to a fractional unit on said scale adjacent to said slit through which said writing medium has been inserted.

12. The method of claim 11 further including the steps of:

inserting said writing medium through a different one of said slits defined in said base, marking a second reference indication on said writing medium corresponding to a fractional unit on said scale adjacent to said second slit, and comparing said first and second reference indications to compare said different fractional units corresponding to said different scales.

13. The method of claim 12 further including the steps of marking said reference indications sequentially on said writing medium to add said fractional units, and comparing said added fractional units to an appropriate scale on said base to determine their sum.

14. The method of claim 12 further including the steps of marking said reference indications in descending order on said writing medium for subtracting said fractions corresponding to said reference indications, and comparing said subtracted fractions to an appropriate scale on said base to determine the difference.

15. The method of claim 11 including the step of sliding said writing medium relative to said base for selectively aligning said writing medium relative to said different scales.

16. The method of claim 15 wherein said the scales are oriented longitudinally relative to said base, and said writing medium inserted into said slit is longitudinally slid along said corresponding scale.

17. The method of claim 15 wherein said scales are oriented longitudinally relative to said base and said writing medium is slid transversely relative to said different scales.

18. The method of claim 11 wherein said indicia are printed directly on said plurality of scales.

19. The method of claim 11 further including the step of forming said base from a transparent material.

20. The method of claim 11 further including the step of defining said slits in said base adjacent to and parallel with said corresponding scales on said base

* * * * *